United States Patent [19]

Stefan

[11] Patent Number: 4,762,457

[45] Date of Patent: Aug. 9, 1988

[54] STORAGE AND RAPID RETRIEVAL SYSTEM

[76] Inventor: Alexander Stefan, 216 E. Arby Ave., Las Vegas, Nev. 89119

[21] Appl. No.: 62,375

[22] Filed: Jun. 15, 1987

Related U.S. Application Data

[63] Continuation-in-part of Ser. No. 701,376, Feb. 14, 1985, abandoned.

[51] Int. Cl.$^4$ .............................................. B65G 1/08
[52] U.S. Cl. ...................................... 414/276; 414/280
[58] Field of Search ............................... 414/266–268, 414/276, 277, 280, 286; 198/359

[56] References Cited

U.S. PATENT DOCUMENTS

| | | | |
|---|---|---|---|
| 1,969,276 | 8/1934 | Pevear | 414/276 X |
| 3,247,929 | 4/1966 | Langley | 414/276 X |
| 3,687,312 | 8/1972 | Weir | 414/276 X |
| 3,750,804 | 8/1973 | Lemelson | 414/276 |
| 3,805,974 | 4/1974 | Andersson et al. | 414/276 |
| 3,895,724 | 7/1975 | Thompson et al. | 414/276 |
| 3,895,725 | 7/1975 | Mayer | 414/266 |
| 4,239,436 | 12/1980 | Wildenaur | 414/276 |

FOREIGN PATENT DOCUMENTS

| | | | |
|---|---|---|---|
| 618775 | 4/1961 | Canada | 414/277 |
| 305221 | 6/1914 | Fed. Rep. of Germany | 414/276 |
| 1133304 | 7/1962 | Fed. Rep. of Germany | 414/266 |

Primary Examiner—Robert J. Spar
Assistant Examiner—David A. Bucci
Attorney, Agent, or Firm—Charles C. Corbin

[57] ABSTRACT

A storage and retrieval system including a pair of spaced-apart longitudinally extending storage racks that provide a plurality of storage compartments, each compartment adapted to store a box-like bin which can contain smaller items, articles of commerce, and the like. Each storage compartment has an inner and outer opening adapted to receive and pass, respectively, a bin, and the compartments are arranged in longitudinally extending rows and in multileveled tiers. A plurality of rail pairs that incline downwardly at about 45 degrees are mounted between storage racks and are adapted to guide a bin placed thereon in speedy sliding motion under the force of gravity. There is means for moving a bin from a compartment and placing it, in alignment, upon an adjoining rail pair and releasing the bin. Near the lower part of the racks are take-off rails which curve from about 45 degrees, towards a horizontal direction, terminating just above a horizontally extending conveyor. These take-offs are adapted to engage a downwardly moving bin and carry it to the conveyor, which moves the bin to a collection point.

8 Claims, 5 Drawing Sheets

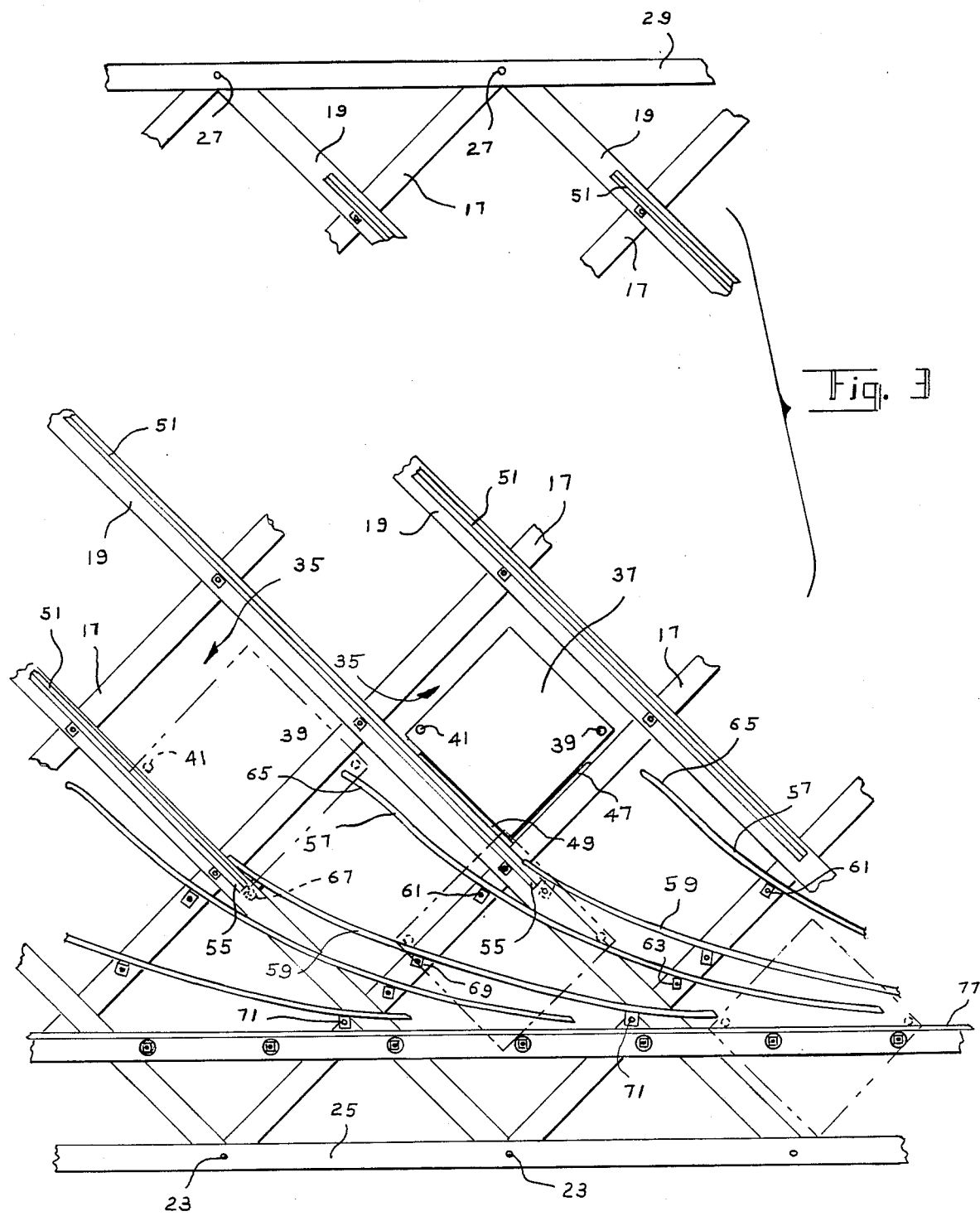

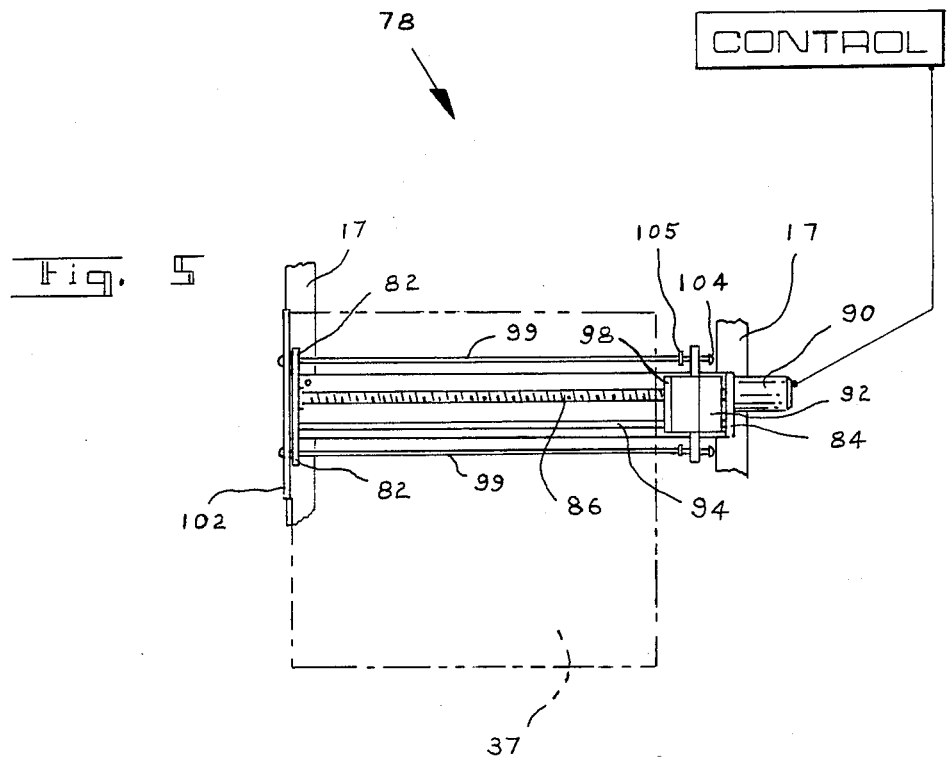

STORAGE AND RAPID RETRIEVAL SYSTEM

BACKGROUND

This is a continuation-in-part of application Ser. No. 701,376, filed Feb. 14, 1985 now abandoned.

This invention relates generally to a system for storing a fairly large number of containers and for quickly retrieving the same from storage. More particularly the invention relates to a method and apparatus for storing on storage racks a plurality of storage bins containing relatively smaller articles, and for gravity propelled rapid retrieval and delivery of selected ones of the bins, as required, to a collection point.

There is a need in any modern system involving the warehousing of a fairly large number of various items, that a storage item be capable of being selected and quickly retrieved from its storage location. A common conventional storage system uses longitudinally and vertically extending storage racks upon which containers, usually palletized, are stored. When it is desirable to retrieve an item, fork lifts and like mechanized lifting equipment are maneuvered along the aisles between racks to search for the pertinent storage location. The lift equipment is then used to reach and retrieve the palletized item, which is then transported to a collection location or other location where it is utilized. In some conventional storage systems for handleable items, such as packages weighing less than 50 lbs., retrieval of an item requires an individual to locate the approximate storage location and then use a step ladder, or lightweight mechanized lift in some cases, to retrieve the item. Oftentimes under these and other prior systems the locating, retrieval and movement of a storage item to a collection point are unduly time-consuming and inefficient and do not lend themselves to the requisites of modern warehousing systems.

SUMMARY

In view of the foregoing it is an object of the present invention to provide a method and apparatus for storing a plurality of storage containers on racks, and which provides for the selection and mechanized rapid retrieval of any particular container as desired.

Another object of the invention is to provide a storage and retrieval system that makes beneficial use of the potential energy of stored containers by utilizing gravitational force to move a retrieved item at relatively high speeds to a collection point.

A further object of the invention is to provide an efficient storage retrieval system.

These and other objects and advantages will be recognized and are achievable by those of ordinary skill in the art by reference to the present invention as described in this summary, and the following detailed description of the drawings and the claims.

Accordingly, the present invention provides a storage and retrieval system that includes a pair of longitudinally and vertically extending storage racks, spaced apart from each other, and each rack providing a plurality of identical storage compartments, which in the preferred embodiment have right-angled, diamond-shaped outer and inner side openings. The compartments are arranged in longitudinally extending rows and in multileveled tiers. There is a plurality of rails, mounted to the inner sides of both racks, to form rail pairs that extend forwardly and downwardly from the upper parts of the racks at about 45 degrees. The invention includes sets of take-off rails that extend from the lower ends of the inclined rail pairs and curve from an approximate 45 degree slope towards a horizontal direction. Horizontally extending conveyor means lay just below the bottom of the take-off rails. The invention also features a plurality of box-like storage bins which may hold a variety of smaller articles. Each rack storage compartment is adapted to receive a bin through its outer opening for storage therein. The bins are adapted to slidingly ride the rails. The system also includes rail loading means for moving a bin out of a compartment and positioning it upon an adjoining rail pair and then releasing it. A bin thusly released will move rapidly down a rail pair under the influence of gravity. When it reaches the take-off rails, means extending outwardly from a bin will be slidingly engaged by the take-off rails so as to guide and deliver the bin to the conveyor. The rail loading means are in electrical communication with control means therefor.

BRIEF DESCRIPTION OF THE DRAWINGS

FIG. 3 is a partial fragmented elevational view taken along the line 3—3 of FIG. 1;

FIG. 5 is a view showing the bin loading mechanism of the invention;

DETAILED DESCRIPTION

Figure 1:
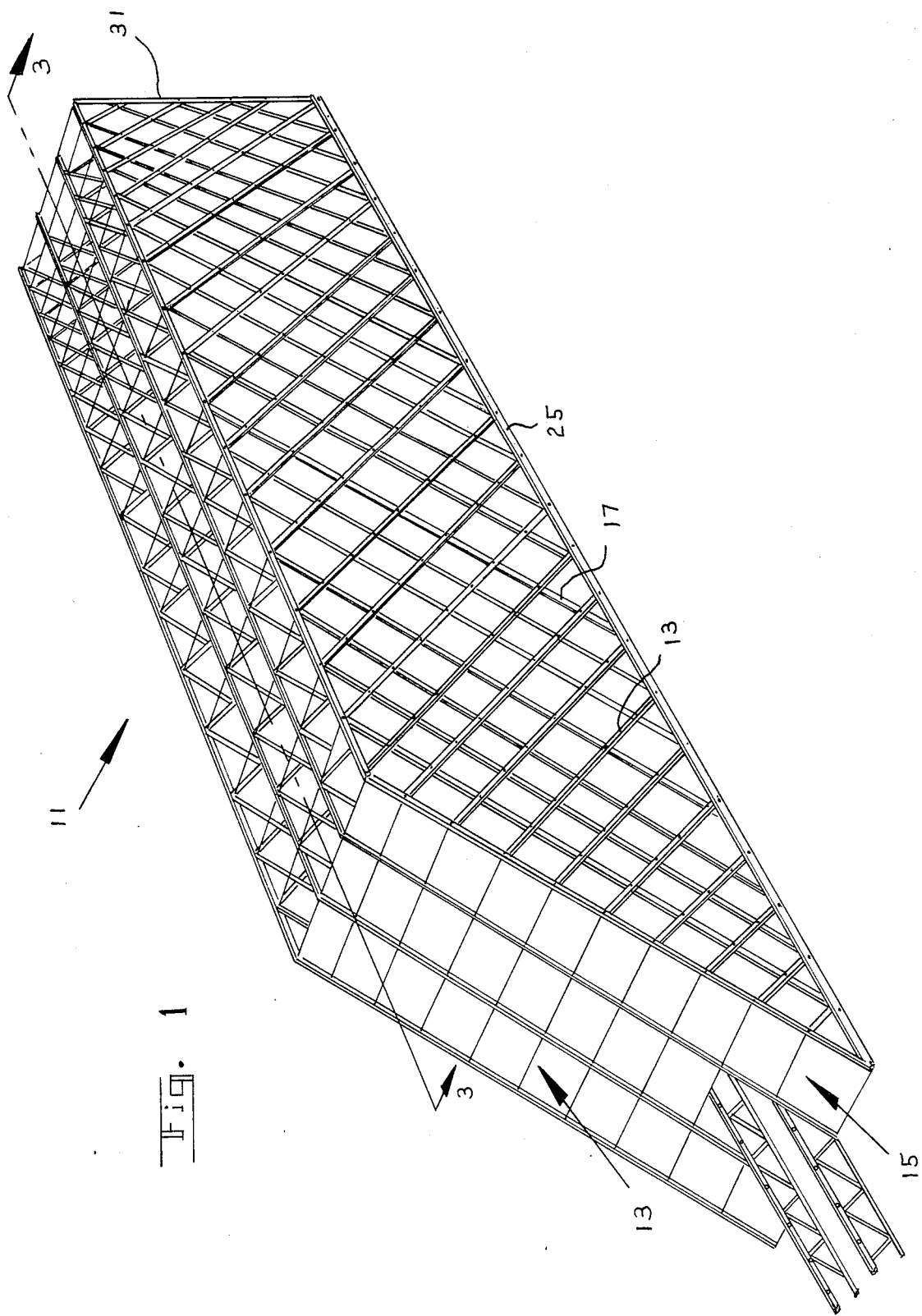
FIG. 1 is a view in perspective illustrating storage and retrieval apparatus according to the invention.

Referring now to the drawings, it is seen in FIG. 1 that a preferred embodiment of the invention includes a lattice-like rack structure 11 which comprises a first rack 13 spaced apart from a second rack 15. The primary support structure of racks 13 and 15 is characterized by elongated inclined members 17, and inclined members 19, all lying at about 45 degrees to the vertical. At intersecting locations, members 17 and 19 are pivotally held together by horizontal rods 21 which extend across both racks 13 and 15. Relative pivoting of members 17 and 19 proves useful during the assembling of racks 13 and 15. Note, in FIG. 3, that the bottom intersecting ends of members 17 and 19 are secured to longitudinally extending stringers 25 by horizontal rods 23. Additional structural integrity is provided at the top of the lattice-like structure by attachment of the top intersecting ends of members 17 and 19 to the upper longitudinally extending stringers 29 by way of upper rods 27. Also note that further support to the structure of racks 13 and 15 is given at the rear of the structure by vertically extending stringers 31 to which is secured the rear intersecting ends of members 17 and 19. In the preferred embodiment members 17 and 19 are made of wood, however, other construction materials such as aluminum or light-weight steel alloy materials may be used.

As FIG. 3 illustrates the racks 13 and 15 provide a number of storage spaces 35 having inner and outer side openings which present a general right-angled, diamond-like configuration.

Figure 2:
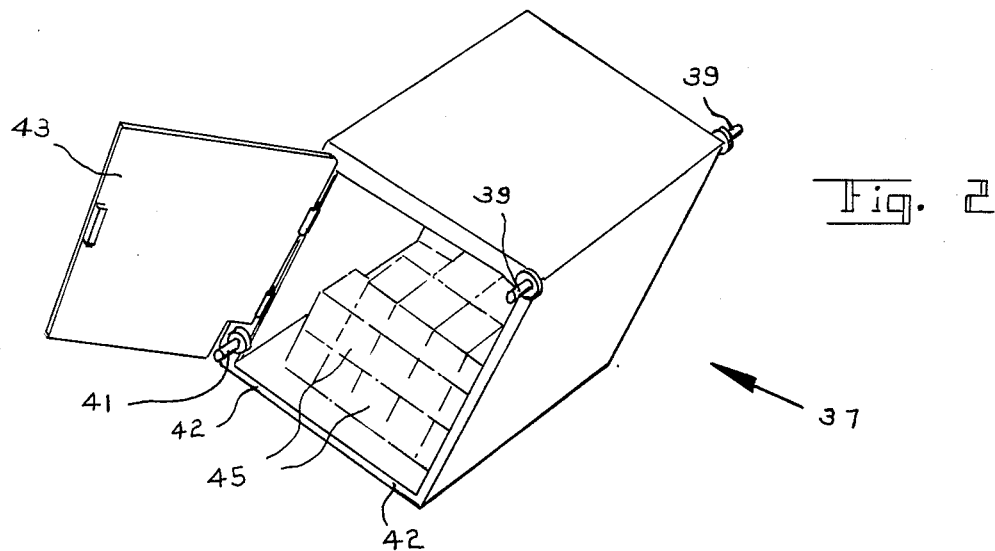
FIG. 2 is a view in perspective of a storage bin according to the invention.

The invention employs a plurality of identical box-like storage bins 37, shown in FIG. 2, which are preferably constructed of aluminum or light-weight steel alloy. A first pair of pins 39 extends horizontally from the upper front corner region of bin 37, and a second pair of pins 41 extends from the lower rear corner region of bin 37. These pins 39 and 41 are preferably made of a strong low friction material such as a Teflon impregnated steel. Lower edge portions 42, including adjoining bottom portions (not shown), on each side of the bin 37, will make sliding contact with a rail system to be described hereinafter. It is preferred that these portions be provided with a durable low friction material such as Teflon. Pins 41 are spaced somewhat above the portions 42. A latchable hinged door 43, of convention of construction, is openable as illustrated in FIG. 2 to reveal a storage chamber for holding a plurality of articles 45 which may represent spare parts, articles of merchandise, or any variety of smaller items according to the particular warehousing application to which the invention is put. The inventory needs, product variety, size, weight, form and value, among other factors, will be considered by those with ordinary skill in the art in determining the size of bins 37 and the rack structure 11.

The inner ones of the inclined members 19, of first and second racks 13 and 15 have rails 51 affixed thereto so as to extend downwardly from the vicinity of upper stringers 29 to terminate in lower ends 55, shown in FIG. 3. In the preferred embodiment the rails 51 have a light-weight metal construction providing a simple L-shaped guiding surface 58. It should be appreciated that under the invention the inclined rails may assume various designs and configurations, including for example, rails equipped with rollers. Pairs of horizontally spaced apart ones of rails 51 are so spaced as to be mountable by a bin 37, with bin lower edge portions 42 slidably engaging the rail guiding surfaces 58. The approximate 45 degree slope of rails 51 permits an appreciable gravitational component to bear upon a rail mounted bin, and given relative low friction between bin portion 42 and rails 51, a bin 37 riding on rails 51 may be accelerated to a relatively high speed.

The rail system of the present invention also includes sets of take-off rails wherein each set comprises an upper take-off 57 and lower take-off 59, shown in FIG. 3. The upper take-off rail 57 has brackets extending therefrom to permit it to be bolted to inclined members 17 at locations 61 and 63. The lower take-off 59 is similarly attached to inclined members 19 and 17 at locations 67, 69, and 71. Note in FIG. 3 that the upper end portion of lower take-off 59 is positioned adjacent the lower end 55 of rail 51. Horizontally spaced pairs of lower take-off rails 59 are aligned so as to engage and slidingly support the posts 41 of a bin 37 that has slid to the end 55 of rail 19. Pairs of upper take-off rails 57 are similarly aligned to be engaged by and slidingly support the upper bin posts 39. Note that FIG. 3 shows take-off 57 having a leading portion 65 which curves somewhat downwardly and is resilient, so as to facilitate smooth engagement with post 39. In the preferred embodiment the take-offs are designed to offer low sliding friction to a descending bin, however, there may be modifications of the invention in which the take-offs are designed to retard the velocity of a bin.

The lower ends 73 and 75, respectively, of take-offs 57 and 59 are spaced a small distance above the top of spaced apart conveyor belts 77. Each belt 77 has an elongated, thin configuration, with a width approximate to that of the take-off rails. The belts 77 are spaced horizontally for a distance which allows a bin 37 to be supported thereon upon its pins 39 and 41, with the bulk of the bin 37 disposed between the conveyor belts 77 as indicated in FIG. 3. The belts 77 are conventionally supported and driven forwardly, as indicated by the arrows. A collection point (not shown) for retrieved storage bins is located at the front end of conveyors 77.

It is to be appreciated that within the scope of the invention there are a variety of support structures that will provide longitudinally extending rows and vertical tiers of storage compartments such as compartments 37, in association with a downwardly inclined system of slide rails. FIG. 3 shows a bin 37a in storage position in a storage space 35, and slidably supported on plates 47 and 49. An alternative means of support (not shown) would be a bed of rollers aligned to provide lateral movement to a bin 37.

The importance of the present invention is in its storage and retrieval aspects and it will be recognized by those having ordinary skill that there are several known methods for loading a bin 37 into a rack compartment. A track mounted mechanism (not shown) extending longitudinally along the outsides of first rack 13 and second rack 15, and adapted to transport and load a bin 37 into a selected storage compartment location is one such loading method.

Figure 6:
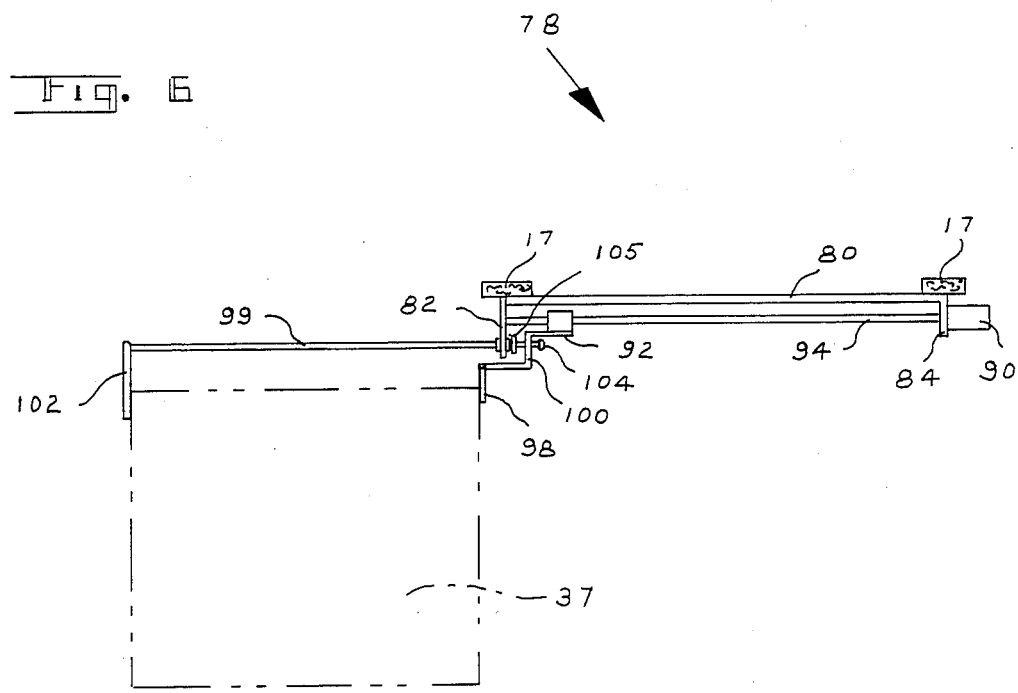
FIG. 6 is a side view of the bin loading mechanism.
Figure 7:
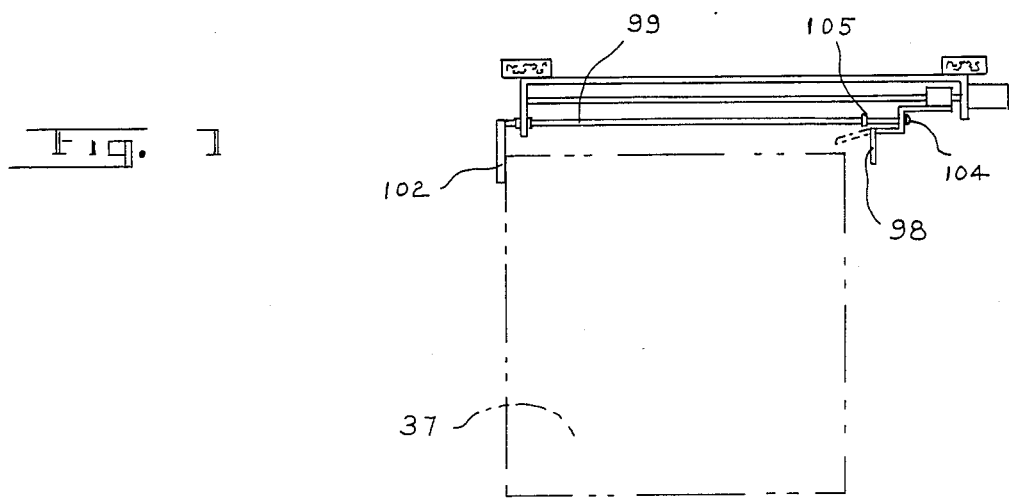
FIG. 7 is a side view of FIG. 5.

The rail loading mechanism 78 is affixed to inclined members 17. As best seen in FIGS. 5 and 6, mechanism 78 includes a base plate 80 having brackets 82 and 84 between which extend a rotatably mounted drive screw 86 and a guide rod 94. An electric motor 90 is operatively linked to the drive screw 86. A platform 92 is conventionally connected to screw 86 and rod 94 for being driven between opposite ends of base 80. A push plate 98 is pivotally mounted to platform 92 and has means biasing it in the upright position shown in FIG. 6. Plate 98 may be resiliently deflected inwardly towards the position shown in phantom lines in FIG. 7. As FIG. 5 shows there is a pair of spaced parallel rods 99 which are slidably received in bracket 82 and in flange 100. First ends of rods 99 have a retaining plate 102 affixed thereto and the other ends terminate in stops 104. A second set of stops 105 is secured to rods 99 a short distance from stops 104. Loading mechanism 78 is mounted in compartment 35 such that when a bin 37 is loaded therein by way of the outer opening of compartment 35, the push plate 98 will be momentarily deflected by the incoming bin, and will spring back into operative position when entry of bin 37 is complete. The retaining plate 102 will arrest the inward movement of a bin 37 when the loading mechanism 78 is in a bin-storage configuration as illustrated in FIG. 7. It is seen here that the stops 104 abut against flange 100 in order to prevent inward movement of rods 99.

Figure 4:
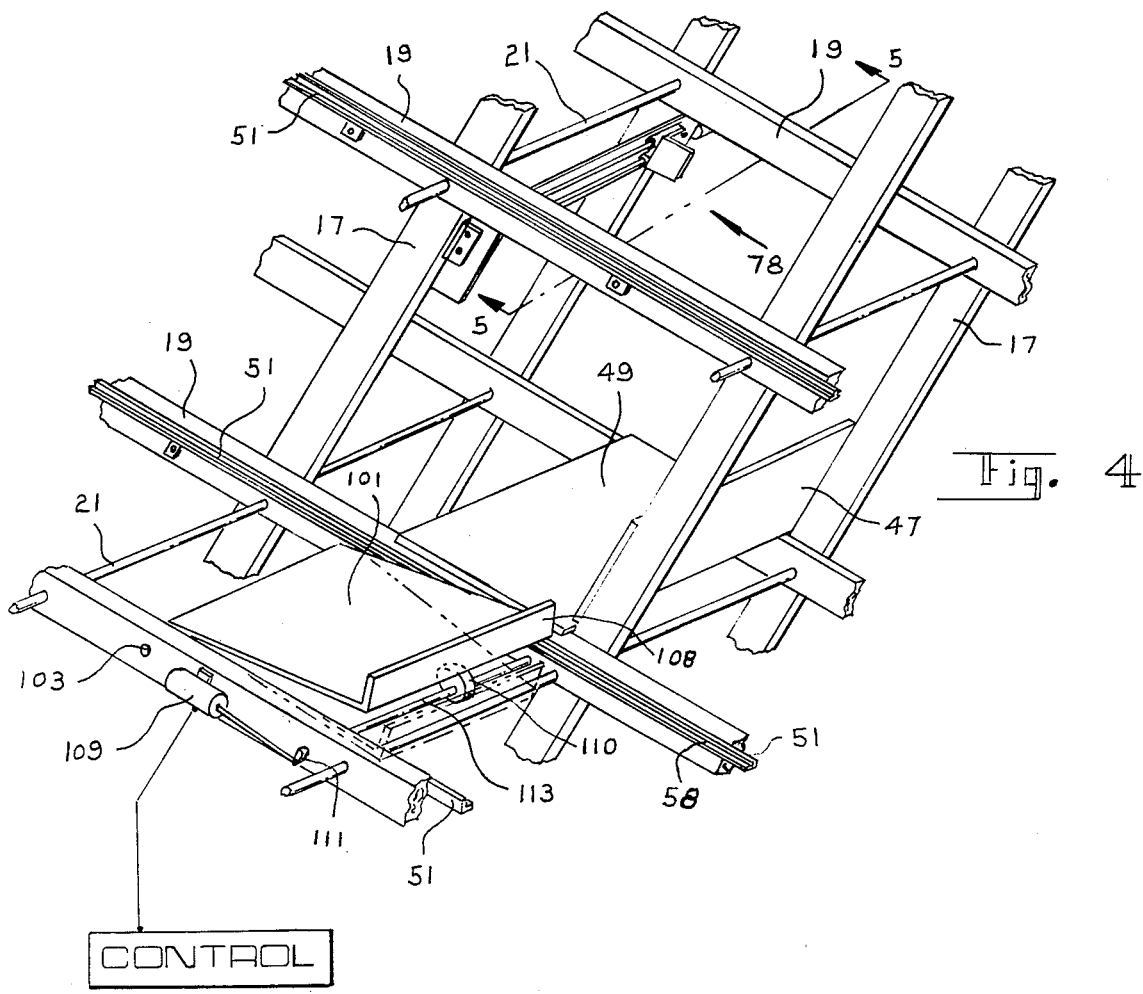
FIG. 4 is a segmented partial view in perspective.

There is a release plate 101 which is pivotally mounted about a shaft 103 as indicated in FIG. 4, and which has a retaining lip 108. A lifting cam 110 is affixed to a rotatably mounted shaft 113, and slidably engages the bottom of release plate 101. A radial arm 111, affixed to the first end of shaft 113, is operatively linked to a servomotor 109 as illustrated in FIG. 4. The release plate 101 is normally in a tucked position, shown in phantom, with its parts below the guiding surfaces 58 of rails 51. Activation of servo-motor 109 will cause rotation of cam 110 which will push the release plate 101 to its loading position in which its upper surface is generally aligned with plate 49 and its lip 108 aligned with plate 47. For the sake of clarity the drawings show only the details of bin handling equipment relating to one storage compartment, and it is to be realized that all compartments are so equipped.

All of the servo motors 109 and electric motors 90 are in electrical communication with conventionally designed control means (not shown) which includes a conveniently located control panel. In the operation of the invention, when it is desired to retrieve a bin 37 from a selected rack storage location, the servo-motor 108 is first energized to raise the release plate 101 to its loading position. In close sequence the motor 90 is then energized to turn drive screw 86 which urges the push plate 98 in contact with the outer wall of a bin 37. Thus a bin 37 is slid inwardly off the plates 47 and 49 and onto release plate 101. During this time the inner wall of bin 37 engages retaining plate 102 and moves it and rods 99 inwardly until the stop 105 trips a conventional limit switch (not shown) which resides on bracket 82. This will signal the stopping of motor 90 and the loading mechanism will be in the configuration shown in FIG. 6. Thus bin 37 will be aligned above rails 51 with lip 108 holding bin 37 against gravitational pull. The direction motor 90 is reversed to retract pusher 98. When pusher 98 has moved a short distance out of contact with bin 37, and before the inwardly moving flange 100 has contacted the stops 104, the servo-motor 109 is reversed to return plate 101 to its tucked position, thereby placing bin 37 on tracks 51 and releasing it to accelerate therealong under the force of gravity. The released bin will move speedily down rails 51 then along take-off rails 59 and 57 to conveyor belts 77. To avoid collision of bins the control system allows only retrieval of one bin at a time. Motor 90 will continue to withdraw platform 92, and the rods 99 and retaining plate 102 will retract when flange 100 engages the stops 104. The motor 90 is stopped and retraction is complete when a second limit switch (not shown), located on bracket 82, is engaged by the retaining plate 102.

While there has been described particular embodiments of the invention, it will be obvious to those skilled in the art that various changes and modifications may be made therein without departing from the invention and, therefore it is aimed to cover all such changes as fall within the true spirit and scope of the invention.

What is claimed is:

1. Storage and retrieval apparatus comprising:
  a. a plurality of box-like storage bins, each having internal storage space for articles and having support means extending outwardly from its lower rear side portions and its upper front side portions respectively;
  b. a pair of longitudinally extending, spaced apart storage racks, each rack having a plurality of identical storage compartments arranged in longitudinally extending rows and in vertically extending tiers, each compartment having an outer opening and an inner opening and adapted to receive at least one of said bins therein;
  c. a plurality of inclined rails mounted at the inner side of said pair of racks, and extending downwardly and forwardly from the top region of the racks to the lower region of the racks, said inclined rails being arranged in horizontally spaced rail pairs that are adapted to slidingly support one of said bins;
  d. a plurality of take-off rails including first take-off rails each of which first take-off rails curves forwardly from the region of the lower end of each of said inclined rails and turns towards a substantially horizontal lower end, said first take-off rails arranged in horizontally spaced pairs which are adapted to slidingly engage the lower rear support means of one of said bins that has moved down said inclined rails, and including second take-off rails that curve toward substantially horizontal lower ends, and mounted in horizontally spaced pairs and adapted to slidingly engage the upper front support means of one of said bins that has moved down said inclined rails;
  e. conveyor means, including a pair of longitudinally extending, forwardly moving, spaced apart belts that lie just below the lower ends of said first and second take-off rails, and adapted to supportingly engage said rear and front support means of one of said bins;
  f. a plurality of rail loading means for moving one of said bins from a rack storage compartment, placing said bin in alignment for sliding engagement with an adjoining one of said inclined rail pairs, and releasing said bin; and
  g. control means in electrical communication with said plurality of rail loading means for remotely operating any one of said rail loading means as required.

2. Apparatus as defined in claim 1 wherein said bin support means comprises horizontally extending pins.

3. Apparatus as defined in claim 1 wherein said storage compartments have a general cubical shape with a general, right-angled, diamond-like cross-sectional configuration.

4. Apparatus as defined in claim 1 wherein said rail pairs are adapted to slidingly engage slide and bottom portions of said bin.

5. Apparatus as defined in claim 1 wherein said inclined rails lie at about 45 degrees to the horizontal.

6. Apparatus as defined in claim 1 wherein said take-off rails are adapted to retard the velocity of a bin moving therealong.

7. Apparatus as defined in claim 1 wherein the construction of said racks is characterized by a plurality of elongated intersecting structural members that are inclined at about 45 degrees to the horizontal.

8. Apparatus as defined in claim 1 wherein said take-off rails are adapted to carry one of said bins without substantially changing the angular orientation that said bin has prior to engagement with said take-off rails.

* * * * *